United States Patent
Tajima et al.

(10) Patent No.: US 8,758,004 B2
(45) Date of Patent: Jun. 24, 2014

(54) EXTRUDER

(71) Applicant: NGK Insulators, Ltd., Nagoya (JP)

(72) Inventors: Yuichi Tajima, Nagoya (JP); Masashi Ono, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/623,990

(22) Filed: Sep. 21, 2012

(65) Prior Publication Data

US 2013/0078326 A1    Mar. 28, 2013

(30) Foreign Application Priority Data

Sep. 28, 2011 (JP) ................................. 2011-212287
Jul. 27, 2012 (JP) ................................. 2012-167282

(51) Int. Cl.
*B29C 47/08* (2006.01)

(52) U.S. Cl.
USPC ........ 425/376.1; 425/204; 425/207; 425/209; 425/382.4; 425/461

(58) Field of Classification Search
USPC ............ 425/204, 207, 209, 382.4, 461, 376.1
See application file for complete search history.

(56) References Cited

U.S. PATENT DOCUMENTS

| | | | | |
|---|---|---|---|---|
| 1,486,328 A | * | 3/1924 | Fraser | 366/77 |
| 3,259,374 A | * | 7/1966 | Doebl et al. | 366/77 |
| 4,118,163 A | * | 10/1978 | Lee | 425/146 |
| 4,935,179 A | | 6/1990 | Kato et al. | |
| 5,500,172 A | * | 3/1996 | Derezinski et al. | 264/68 |
| 5,667,833 A | * | 9/1997 | Juengling et al. | 426/496 |
| 6,338,867 B1 | * | 1/2002 | Lihotzky-Vaupel | 426/557 |
| 2004/0194427 A1 | | 10/2004 | Ishii et al. | |

FOREIGN PATENT DOCUMENTS

| | | |
|---|---|---|
| JP | 63-230304 | 9/1988 |
| JP | 07-032335 | 2/1995 |
| JP | 2003-311726 | 11/2003 |
| JP | 2010-105165 | 5/2010 |

* cited by examiner

Primary Examiner — Yogendra Gupta
Assistant Examiner — Joseph Leyson
(74) Attorney, Agent, or Firm — Burr & Brown, PLLC

(57) ABSTRACT

An extruder comprises an extruding section, a chamber drum, and a forming section. The extruding section kneads and extrudes a kneaded material including a ceramic raw material. The chamber drum includes a first space portion which extends from the extrusion port side of the extruding section in an extruding direction and allows the kneaded material to flow in the extruding direction, and a second space portion which extends from a downstream side of the first space portion in a downward direction, allows the kneaded material to flow in the downward direction different from the extruding direction, and has a discharge port to discharge the kneaded material. The forming section includes a die through which the kneaded material discharged through the discharge port of the chamber drum is pushed out, to extrude and form ceramic formed bodies.

14 Claims, 5 Drawing Sheets

EXTRUDING DIRECTION

BEND

EXTRUDER

The present application is an application based on JP2011-212287 filed on Sep. 28, 2011 and JP2012-167282 filed on Jul. 27, 2012 with the Japanese Patent Office, the entire contents of which are incorporated herein by reference.

BACKGROUND OF THE INVENTION

1. Field of the Invention

The present invention relates to an extruder for formation of ceramic formed bodies, and more particularly, it relates to an extruder which can extrude and form large sized ceramic formed bodies having a large size.

2. Description of the Related Art

A ceramic honeycomb structure for use as a catalyst carrier, a filter or the like to purify an exhaust gas is manufactured through steps of extrusion, drying and firing, and thus a large sized ceramic honeycomb structure is requested for the purpose of purifying an exhaust gas from a large vehicle, a construction machine, a ship or the like.

The extrusion of laterally enlarged honeycomb formed bodies is accompanied with the problem that the honeycomb formed bodies are deformed due to their own weight. Therefore, the extrusion of the large sized honeycomb formed bodies is performed in a downward direction (the gravity direction).

In Patent Documents 1 and 2, an extrusion forming method of a ceramic formed body in a downward direction is disclosed. Moreover, in Patent Document 3, there is disclosed an extrusion forming machine in which a two-stages screw type extrusion forming machine is provided with a plunger type extruder. A kneaded material which is kneaded by the two-stages screw type extrusion forming machine is extruded in the downward direction by the plunger type extruder. Furthermore, in Patent Document 4, a vertical extruder including a screw is disclosed.

[Patent Document 1] JP-A-S63-230304
[Patent Document 2] JP-A-2003-311726
[Patent Document 3] JP-A-H07-32335
[Patent Document 4] JP-A-2010-105165

In Patent Documents 1 and 2, a raw material is formed into a kneaded material having a predetermined shape (the columnar shape) by use of a clay kneader, and the kneaded material is put in a forming machine, to extrude and form honeycomb formed bodies. There has been the problem that when the kneaded material having the predetermined shape is intermittently put in the forming machine and several honeycomb formed bodies are extruded from the one kneaded material having the predetermined shape, at a joint (change) portion between the one columnar kneaded material and another kneaded material, the surface of the honeycomb formed body becomes rough and a suitable honeycomb formed body cannot be obtained.

A forming device of Patent Document 3 has a stop time due to an intermittent operation of a plunger, and has a poor efficiency. Moreover, this forming device has the problem that a quality of the formed body (especially, the state of an outer peripheral portion) is poor at re-extrusion after the stop of the plunger. A forming device of Patent Document 4 has a three-stages screw constitution, and has the problem that a device constitution is complicated and increases cost.

An object of the present invention is to provide an extruder which decreases waste of a material or forming time, and extrudes and forms ceramic formed bodies having a suitable quality in the extrusion of large sized ceramic formed bodies.

SUMMARY OF THE INVENTION

The present inventors have found that when an extruder comprises a chamber drum including a first space portion and a second space portion between an extruding section which kneads and extrudes a kneaded material and a forming section which extrudes and forms ceramic formed bodies, the above problem can be solved.

According to a first aspect of the present invention, an extruder is provided, comprising an extruding section which kneads and extrudes a kneaded material including a ceramic raw material, a chamber drum connected to an extrusion port of the extruding section, and including a first space portion which extends from the extrusion port side of the extruding section in an extruding direction and allows the kneaded material to flow in the extruding direction, and a second space portion which extends from a downstream side of the first space portion in a downward direction, allows the kneaded material to flow in the downward direction different from the extruding direction, and has a discharge port to discharge the kneaded material, and a forming section connected to the discharge port of the chamber drum, and including a die through which the kneaded material discharged through the discharge port of the chamber drum is pushed out, to extrude and form ceramic formed bodies.

According to a second aspect of the present invention, an extruder according to the first aspect is provided, wherein the extruding direction from the extruding section is a horizontal direction, the downward direction in which the chamber drum discharges the kneaded material is a gravity direction, and the extruding direction from the extruding section crosses the gravity direction at right angles.

According to a third aspect, the extruder according to the above first or second aspects is provided, wherein the first space portion includes a taper portion formed in such a taper shape that a sectional area decreases from the extrusion port side of the extruding section toward the downstream side of the extruding direction, and a cylindrical portion which is continuous with the taper portion.

According to a fourth aspect, the extruder according to the above third aspect is provided, wherein the taper portion has an angle θ of 5 to 30° which is represented by the following equation (1), $$\theta = \tan^{-1}(D1-D2)/2L1 \qquad (1),$$

in which D1 is a height of an inlet of the taper portion, D2 is a diameter of an outlet, and L1 is a length of the taper portion in the extruding direction.

According to a fifth aspect, the extruder according to any one of the above first to fourth aspects is provided, wherein the second space portion has a cylindrical shape which extends from a lower portion of the first space portion on the downstream side thereof in the downward direction.

According to sixth aspect, the extruder according to the above fifth aspect is provided, wherein the first space portion includes a taper portion formed in such a taper shape that a sectional area decreases from the extrusion port side of the extruding section toward the downstream side of the extruding direction, and has a ratio d/D2 of 0.1 to 0.3, in which D2 is a diameter of an outlet of the taper portion, and d is a diameter of the second space portion.

According to a seventh aspect, the extruder according to any one of the above first to sixth aspects is provided, wherein the extruding section includes a drum having a supply port through which a kneaded material including a ceramic forming raw material flows into the extruding section, and an extrusion port through which the kneaded material is discharged; and a screw disposed in the drum, and having a rotary shaft and a rotation blade of a spiral shape along the rotary shaft, to convey the kneaded material in an extruding direction parallel to the rotary shah while kneading the kneaded material by the rotation of the rotation blade.

According to an eighth aspect of the present invention, the extruder according to the above seventh aspect is provided, wherein the extruding section is provided with the screws which are biaxially arranged in parallel in the drum.

Effect of the Invention

An extruder comprises a chamber drum including a first space portion and a second space portion between an extruding section which kneads and extrudes a kneaded material and a forming section which extrudes and forms ceramic formed bodies. Consequently, the ceramic formed bodies having an excellent quality can continuously be extruded and formed. The chamber drum discharges the kneaded material under the material's own weight in a downward direction different from an extruding direction of the extruding section, and hence a defect such as deformation does not easily occur even in large sized ceramic formed bodies.

DETAILED DESCRIPTION OF THE INVENTION

Hereinafter, embodiments of the present invention will be described with reference to the drawings. The present invention is not limited to the following embodiment, and can be altered, modified or improved without departing from the scope of the present invention.

Figure 1:
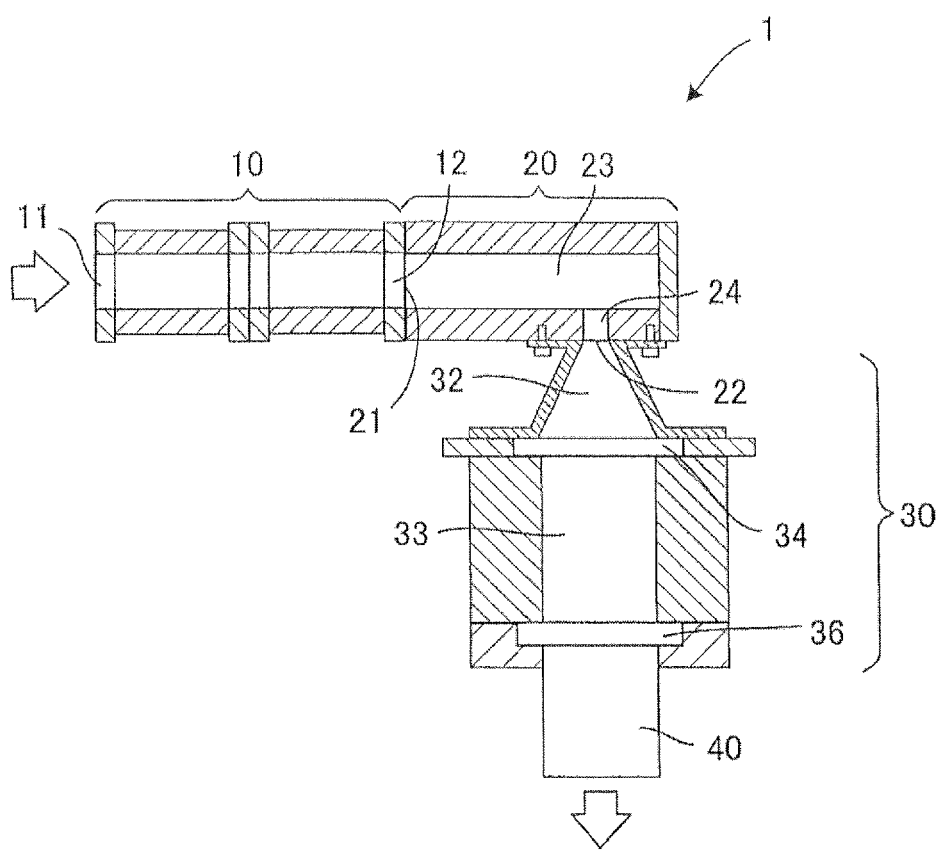
FIG. 1 is a schematic view showing one embodiment of an extruder of the present invention.

FIG. 1 shows one embodiment of an extruder 1 of the present invention. The extruder 1 includes an extruding section 10, a chamber drum 20, and a forming section 30. The extruding section 10 kneads and extrudes a kneaded material including a ceramic raw material. The chamber drum 20 is connected to an extrusion port 12 of the extruding section 10. Moreover, the chamber drum 20 includes a first space portion 23 which extends from the extrusion port 12 side of the extruding section 10 in an extruding direction and allows the kneaded material to flow in the extruding direction, and a second space portion 24 which extends from a downstream side of the first space portion 23 in a downward direction, allows the kneaded material to flow in the downward direction different from the extruding direction, and has a discharge port 22 to discharge the kneaded material. Furthermore, the forming section 30 is connected to the discharge port 22 of the chamber drum 20. In addition, the forming section 30 includes a die 36 through which the kneaded material discharged through the discharge port 22 of the chamber drum 20 is pushed out, to extrude and form ceramic formed bodies. Additionally, a honeycomb formed body 40 will be described as an example of each ceramic formed body, but the ceramic body is not limited to the honeycomb formed body 40.

The extruding section 10, the chamber drum 20 and the forming section 30 are continuously connected, and hence the kneaded material can be kneaded, and the honeycomb formed bodies 40 can continuously be extruded and formed. Therefore, waste of a material or forming time can be decreased. Moreover, since the honeycomb formed body 40 is extruded in the downward direction, even the large sized honeycomb formed body 40 is not easily deformed, and also has a suitable quality.

The extruder 1 preferably has a constitution where the extruding direction from the extruding section 10 is a horizontal direction, the downward direction in which the chamber drum 20 discharges the kneaded material is a gravity direction, and the extruding direction from the extruding section 10 crosses the gravity direction at right angles. According to such a constitution, when the downward direction is the gravity direction, even the large sized honeycomb formed body 40 is not deformed under own weight, and can suitably be extruded. Moreover, when the extruding direction from the extruding section 10 is the horizontal direction, a broad vertical space is not required to place the extruder 1.

Figure 2:
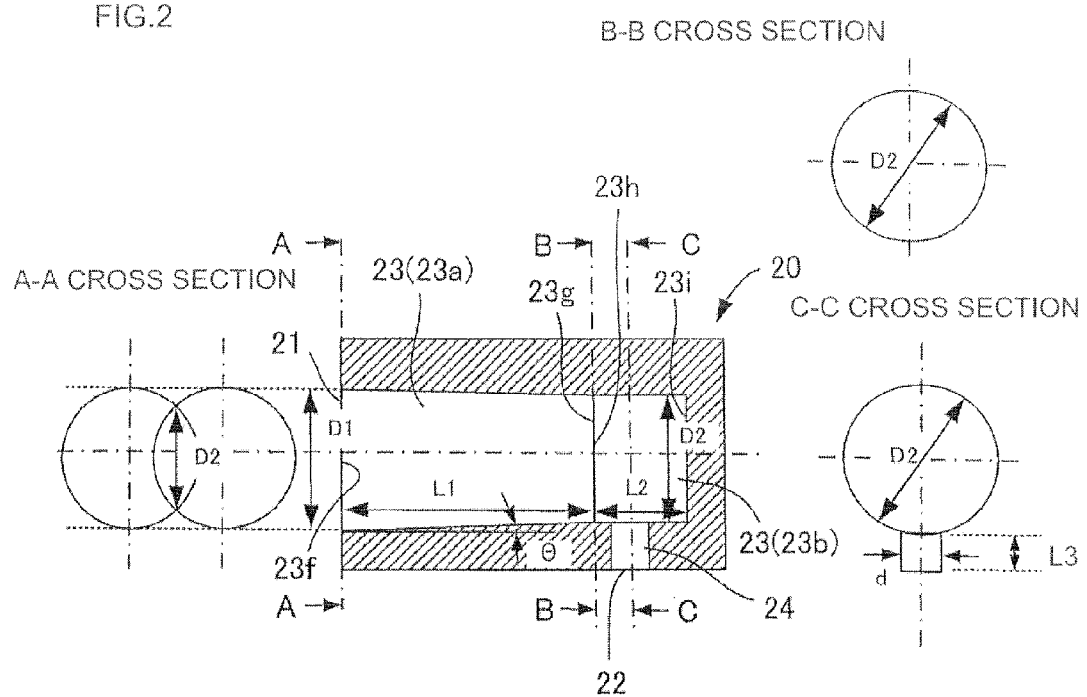
FIG. 2 is a schematic view showing one embodiment of a chamber drum.

Hereinafter, the extruder 1 will be described in more detail. FIG. 2 shows one embodiment of the chamber drum 20.

(Chamber Drum)

As shown in FIG. 2, the chamber drum 20 includes the first space portion 23 and the second space portion 24, and a supply port 21 and the discharge port 22 are formed. The first space portion 23 has a space which extends from the extrusion port 12 side of the extruding section 10, i.e., from the supply port 21 in the extruding direction, and allows the kneaded material to flow in the extruding direction. Moreover, the first space portion 23 preferably includes a taper portion 23a formed in such a taper shape that a sectional area decreases from the supply port 21 toward the downstream side of the extruding direction, and a cylindrical portion 23b which is continuous with the taper portion 23a.

Furthermore, the taper portion 23a preferably has an angle θ of 5 to 30° which is represented by the following equation (1), $$\theta = \tan^{-1}(D1-D2)/2L1 \qquad (1),$$

in which D1 is a height of an inlet (an upstream end 23f) of the taper portion, i.e., the height of the supply port 21, D2 is a diameter of an outlet (a downstream end 23g), and L1 is a length of the taper portion in the extruding direction (a distance between the upstream end 23f and the downstream end 23g).

Additionally, the height D1 of the supply port 21 is preferably the same as a diameter of a screw 14 of the extruding section 10. Moreover, when a length of the cylindrical portion 23b in the extruding direction (a distance between an upstream end 23h and a downstream end 23i) is L2, there is not any special restriction on the L2, but this length is preferably twice to four times as large as a diameter d of the second space portion 24, and further preferably about three times.

When the extruding section 10 is provided with the screws 14 which are biaxially arranged in parallel (see FIG. 3), as shown in FIG. 2, an A-A cross section of the chamber drum 20 is preferably formed in a shape where circles are overlapped. The respective circles correspond to outer shapes and positions of the screws 14 of the extruding section 10. A B-B cross section of the downstream end 23g of the taper portion 23a is preferably one circle. Furthermore, the shape is preferably smoothly changed in a taper-like manner from the A-A cross section to the B-B cross section. Moreover, after the B-B cross section (from the upstream end 23h of the cylindrical portion to the downstream end 23i of the cylindrical portion), the cylindrical portion 23b is preferably formed with the diameter D2 of the circle in the B-B cross section. Additionally, D2 is a length of a portion of the A-A cross section where two circles each having the diameter D1 cross.

When $5° \leq \theta$ in the equation (1), the chamber drum 20 can be prevented from becoming long, and a volume thereof can be prevented from becoming excessively large. Moreover, an increase of an extrusion torque or an increase of a manufacturing cost of the extruder can be suppressed. When $\theta \leq 30°$, it is possible to prevent occurrence of bend of the honeycomb formed body 40. Moreover, when $5° \leq \theta \leq 30°$, a pressure state of the flow of the kneaded material by the screws 14 can be set to a hydrostatic pressure state, and the direction of the flow of the kneaded material can smoothly be changed to the downward direction. In consequence, it is possible to obtain the suitable honeycomb formed body 40 which does not have any bend.

The second space portion 24 preferably has a cylindrical shape which extends from a lower portion of the first space portion 23 on the downstream side thereof in the downward direction. The second space portion 24 is preferably positioned slightly more closely to the upstream side than the downstream end 23i of the first space portion 23. That is, as shown in a C-C cross section, a downward hole is disposed as the second space portion 24. The second space portion 24 performs a function of squeezing the extruded kneaded material to rectify the flow of the material so that the downstream flow becomes even.

The first space portion 23 includes the taper portion 23a formed in such a taper shape that a sectional area decreases from the extrusion port 12 side of the extruding section 10 toward the downstream side of the extruding direction, and has a ratio d/D2 of 0.1 to 0.3, in which D2 is a diameter of an outlet of the taper portion 23a, and d is a diameter of the second space portion 24. Moreover, a length (L3) of the second space portion 24 is preferably L3=2d. When the second space portion 24 is disposed in this manner, a pressure variance of the flow of the kneaded material can be alleviated. Moreover, it is possible to obtain the suitable honeycomb formed body 40 which does not have any bend.

(Extruding Portion)

Figure 3:
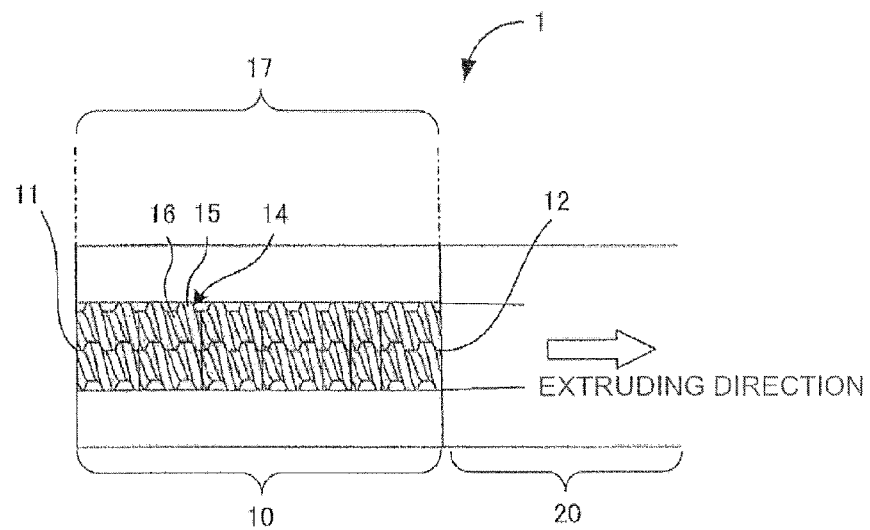
FIG. 3 is a schematic view showing one embodiment of an extruding section.

FIG. 3 shows one embodiment of the extruding section 10. The extruding section 10 includes a drum 17 having a supply port 11 and the extrusion port 12, and the screw 14 in the drum 17. The kneaded material including a ceramic forming raw material flows into the extruding section 10 through the supply port 11. The screw 14 includes a rotary shaft 16 and a rotation blade 15 of a spiral shape along the rotary shaft 16, to convey the kneaded material in an extruding direction parallel to the rotary shaft 16 while kneading the material by the rotation of the rotation blade 15.

In the extruding section 10, the screws 14 are preferably biaxially arranged in parallel in the drum 17. When the screws are biaxially arranged in parallel in this manner, it is possible to convey the kneaded material with a sufficient pressure. However, the extruder 1 of the present invention is not limited to the biaxial screws 14.

(Forming Section)

The forming section 30 is connected to the discharge port 22 of the chamber drum 20, and pushes out the kneaded material discharged through the discharge port 22 of the chamber drum 20, to form the honeycomb formed body 40.

The forming section 30 includes a first enlarging diameter portion 32 connected to the second space portion 24, and a second enlarging diameter portion 33 through which the honeycomb formed body 40 is extruded. The first enlarging diameter portion 32 has such a taper shape that a diameter thereof gradually enlarges. The second enlarging diameter portion 33 continuous with the first enlarging diameter portion has such a substantially cylindrical shape that a diameter thereof slightly enlarges on the downstream side, or such a cylindrical shape that the diameter is constant. Between the first enlarging diameter portion 32 and the second enlarging diameter portion 33, a screen 34 to remove a foreign matter is interposed. The screen 34 removes coarse particles or the foreign matter from the kneaded material, and, for example, a mesh including openings of about 65 to 420 μm and made of SUS304 can preferably be used. Moreover, the die 36 is disposed at a downstream end of the second enlarging diameter portion 33.

In the die 36 through which there is extruded the honeycomb formed body 40 for use as a catalyst carrier to purify an exhaust gas of a gasoline engine, a slit width of a slit through which the honeycomb formed body 40 is extruded is preferably from 70 to 170 μm, and especially preferably from 70 to 125 μm. Moreover, the die 36 communicates with the slit therein, and diameters of a plurality of kneaded material introduction holes (back holes) used as the introduction holes of the kneaded material into the die 36 are preferably from 0.08 to 0.20 cm. On the other hand, in the die 36 through which there is extruded the honeycomb formed body 40 for use as a diesel particulate filter (the DPF) to remove a particulate matter (the PM) of a diesel engine, a slit width of a slit through which the honeycomb formed body 40 is extruded is preferably from 100 to 600 μm, and especially preferably from 300 to 450 μm. Moreover, in the die 36, diameters of a plurality of kneaded material introduction holes (back holes) are preferably from 0.1 to 0.3 cm.

Figure 4:
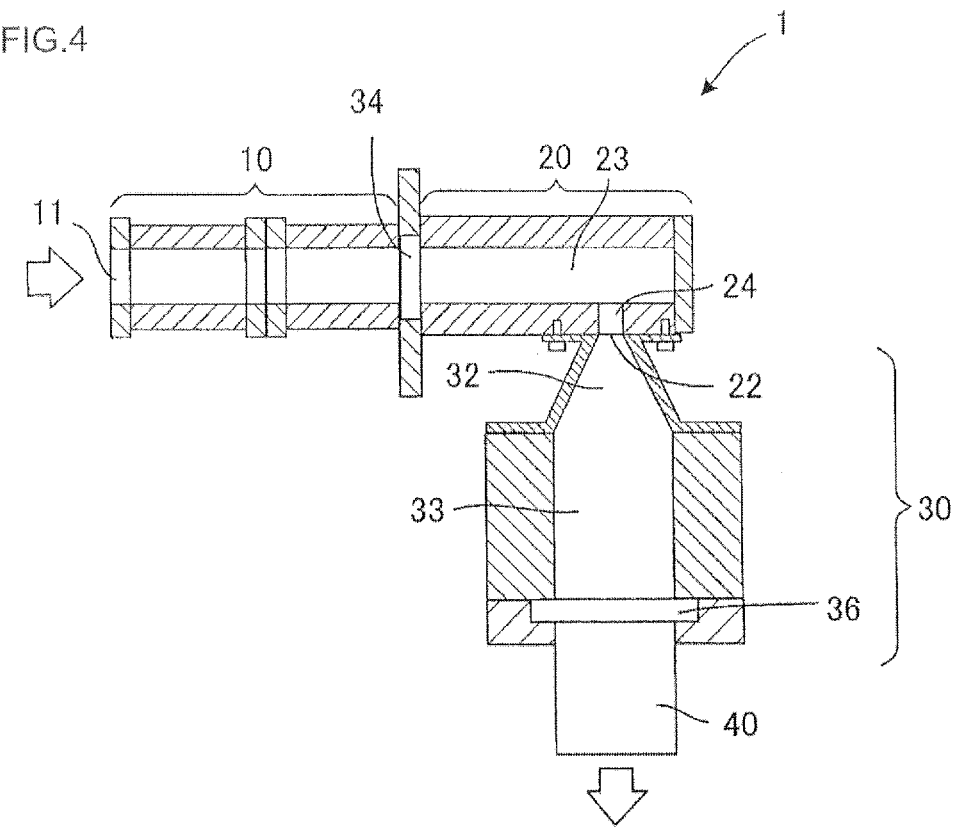
FIG. 4 is a schematic view showing another embodiment of the extruder.

FIG. 4 shows another embodiment of the extruder 1. In the present embodiment, a screen 34 to remove a foreign matter is interposed between an extruding section 10 and a chamber drum 20. In the present embodiment, a kneaded material which is kneaded by the extruding section 10 is extruded from the extruding section 10 to the chamber drum 20. At this time, when the kneaded material passes through the screen 34, the foreign matter included in the kneaded material is removed. When the screen 34 is disposed at this position, the screen 34 is more easily changed in the present embodiment, depending on a layout of the whole extruder.

Figure 5:
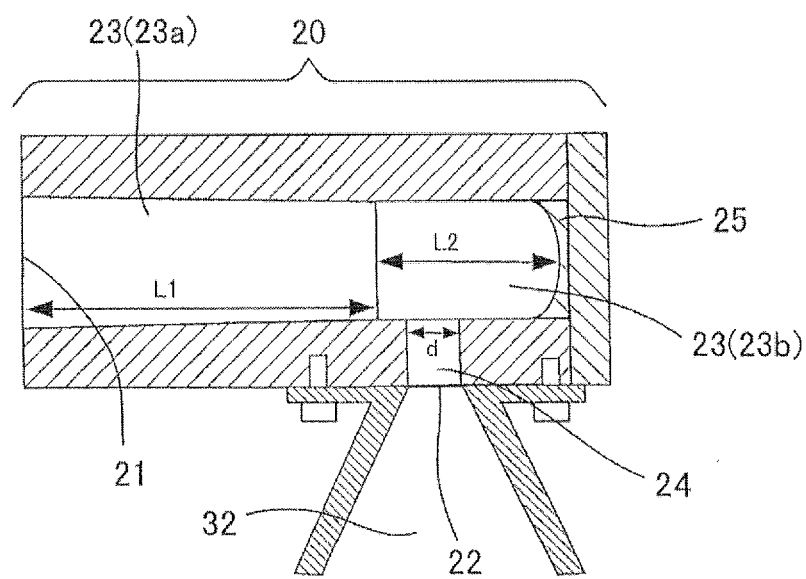
FIG. 5 is a schematic view showing an embodiment including a stagnation preventing die in a chamber drum.

FIG. 5 shows still another embodiment of the extruder 1. In the present embodiment, in a space where a kneaded material easily stagnate in a chamber drum 20, a stagnation preventing die 25 with which the space is filled is disposed.

Specifically, the stagnation preventing die 25 is disposed at a downstream end of the chamber drum 20 in a horizontal direction (the downstream end of a first space portion 23). The stagnation preventing die 25 is a cylindrical body having a surface on an upstream side (the side which comes in contact with the kneaded material) which is a concave-like curved surface. That is, the die has a planoconcave lens shape having one surface (on the upstream side) that is a concave surface and the other surface (on the downstream side) that is a flat surface. When the stagnation preventing die 25 is disposed, L2 (the length of the longest portion of a cylindrical portion 23b in an extruding direction) is preferably about three times as large as a diameter d of a second space portion 24. Consequently, waste of the kneaded material can be decreased. Moreover, it is possible to prevent an old kneaded material from remaining, being mixed with a new kneaded material and deteriorating a product quality.

(Manufacturing Method of Honeycomb Formed Body)

Next, there will be described a manufacturing method of the honeycomb formed body 40 by use of the extruder 1 of the present invention. First, there is obtained the kneaded material including a ceramic raw material, water, methylcellulose, an additive and the like. As the ceramic raw material, it is possible to use a cordierite forming raw material, silicon carbide, metal silicon, sialon, mullite, silicon nitride, zirconium phosphate, zirconia, titania, alumina, silica, cordierite, a mixture of these materials, or the like. The cordierite forming raw material is the raw material which becomes cordierite when fired. Further to the kneaded material, a resin balloon or a water absorbing polymer may be added. Examples of the resin balloon can include an acrylic microcapsule. The resin balloon functions as a pore former. When the water absorbing polymer is mixed and kneaded with the water together with the ceramic raw material or an organic binder, the polymer absorbs the water, obtains a structure where water is held in the polymer, and has the characteristics that a mechanical strength is high and that the structure is not easily broken. Examples of the water absorbing polymer can include a water absorbing resin. More specifically, the examples of the polymer can include an acrylic resin.

The obtained kneaded material is supplied to the extruding section 10. The kneaded material which is kneaded by the extruding section 10 is conveyed to the chamber drum 20. In the chamber drum 20, the kneaded material conveyed in a horizontal direction changes the direction to a gravity direction (the downward direction), and is then conveyed to the forming section 30. The kneaded material is extruded as the honeycomb formed body 40 through the downstream end (the lower portion) of the forming section 30.

EXAMPLES

Hereinafter, the present invention will be described in more detail based on examples, but the present invention is not limited to these examples.

Example 1

Figure 6:
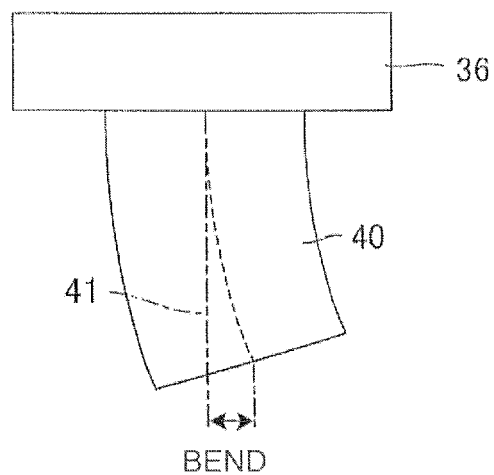
FIG. 6 is a schematic view for explaining bend of a honeycomb formed body.

A honeycomb formed body 40 was extruded and formed by using the extruder 1 shown in FIG. 1. First, a kneaded material including a ceramic raw material, water, methylcellulose, an additive and the like was supplied to an extruding section 10. Then, the honeycomb formed body 40 was extruded from a forming section 30. A slit width of a die 36 was 150 μm, and a diameter of each back hole was 0.14 cm. A size of the honeycomb formed body 40 was a diameter of 410 mm. Results are shown in Table 1. The honeycomb formed body 40 hardly bent, and a surface state thereof was suitable. Even the honeycomb formed body 40 having a diameter of 300 mm or larger was suitable. Additionally, the bend is a distance from a central axis 41 in the center of a front edge of the honeycomb formed body 40 extruded through the die 36, as shown in FIG. 6.

Example 2

Similarly to Example 1, a kneaded material including a ceramic raw material, water, methylcellulose, an additive, a resin balloon, a water absorbing polymer and the like was extruded by using a die 36 having a slit width of 410 μm and a back hole diameter of 0.21 cm. A size of a honeycomb formed body 40 was a diameter of 410 mm. The honeycomb formed body 40 hardly bent, and a surface state thereof was suitable.

Comparative Example 1

Figure 7:
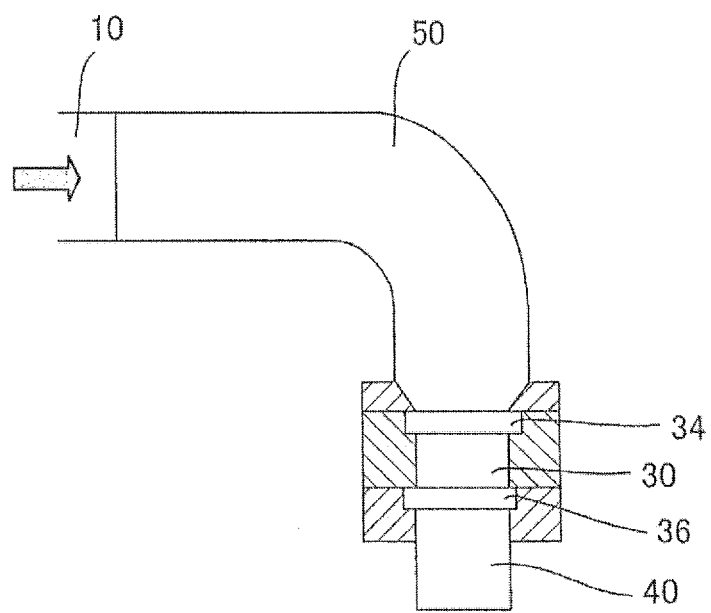
FIG. 7 is a schematic view showing a curved drum of Comparative Example 1.

Similarly to Example 1, the extrusion of a honeycomb formed body 40 was performed by using an extruder including a curved drum 50 between an extruding section 10 and a forming section 30 as shown in FIG. 7. Results are shown in Table 1. A surface state was suitable, but the honeycomb formed body 40 noticeably bent.

Comparative Example 2

Figure 8:
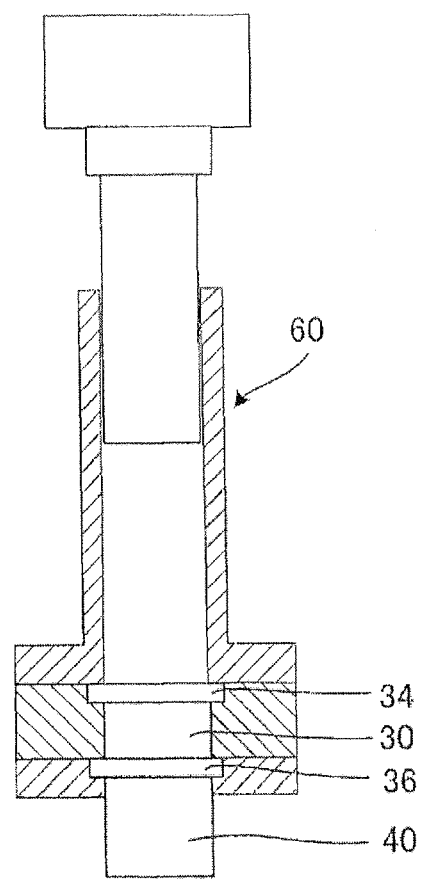
FIG. 8 is a schematic view showing a plunger of Comparative Example 2.

A kneaded material was kneaded by an extruder to obtain a columnar kneaded material which was put in a plunger 60 shown in FIG. 8, to extrude a honeycomb formed body 40. Results are shown in Table 1. The columnar kneaded material was intermittently supplied to the plunger 60, and hence long manufacturing time was required. The honeycomb formed body 40 did not noticeably bend, but a surface state was not suitable.

Results are shown in Table 1. A yield of the raw material=(a mass of a suitable formed body)/(a mass of the input kneaded material)×100(%).

TABLE 1

| | Drawing | Use application | Extruder | Drum | θ | d/D2 | Operation state | Bend | Extrusion torque | Pressure variance | Surface state | Yield of raw material |
|---|---|---|---|---|---|---|---|---|---|---|---|---|
| Example 1 | FIG. 1 | Catalyst carrier | Biaxial screw | Chamber drum of FIG. 2 | 5° | 0.1 | Continuous | 0.5 mm | 2180 Nm | ±3 bar | Suitable | 94% |
| Example 2 | FIG. 1 | DPF | Biaxial screw | Chamber drum of FIG. 2 | 5° | 0.1 | Continuous | 0.6 mm | 1830 Nm | ±3 bar | Suitable | 92% |
| Comparative Example 1 | FIG. 7 | Catalyst carrier | Biaxial screw | Curved drum | — | — | Continuous | 9 mm | — | — | Suitable | 94% |
| Comparative Example 2 | FIG. 8 | Catalyst carrier | | Plunger | — | — | Intermittent | 1.5 mm | — | — | Defective | 80% |

As above, in Example 1, it was possible to continuously perform the extrusion, and it was possible to decrease manufacturing cost. The extruded honeycomb formed body 40 hardly bent, and a surface state was suitable.

Chamber Drum

Examples 3 to 6

Next, an angle θ of a taper portion 23a of a chamber drum 20 was investigated. The angle θ is represented by the following equation (1), $$\theta = \tan^{-1}(D1-D2)/2L1 \quad (1),$$

in which D1 is a diameter of an inlet of the taper portion 23a, i.e., a height of a supply port 21, D2 is a diameter of an outlet, and L1 is a length in an extruding direction. Results at the change of θ are shown in Table 2. Additionally, the other conditions are similar to those of Example 1. Moreover, Example 1 of Table 2 is the same as Example 1 of Table 1.

TABLE 2

|  | Use application | θ | d/D2 | Bend | Extrusion torque | Pressure variance | Surface state |
|---|---|---|---|---|---|---|---|
| Example 3 | Catalyst carrier | 2° | 0.1 | 0.5 mm | 2590 Nm | ±3 bar | Suitable |
| Example 1 | Catalyst carrier | 5° | 0.1 | 0.5 mm | 2180 Nm | ±3 bar | Suitable |
| Example 4 | Catalyst carrier | 10° | 0.1 | 0.5 mm | 2100 Nm | ±3 bar | Suitable |
| Example 5 | Catalyst carrier | 30° | 0.1 | 0.9 mm | 1990 Nm | ±4 bar | Suitable |
| Example 6 | Catalyst carrier | 50° | 0.1 | 3 mm | 1930 Nm | ±5 bar | Suitable |

When θ<5°, the chamber drum became long, a volume became large, and an extrusion torque and extruder cost increased (Example 3). When 30°>θ, the bend of the honeycomb formed body 40 slightly occurred (Example 6). The above cases were in an allowable range, but when 5°≤θ≤30°, the flow of the kneaded material was suitable, a direction was smoothly changed to a downward direction, and the suitable honeycomb formed body 40 which did not have any bend was obtained. (Examples 1, 4 and 5).

Examples 7 to 10

Next, a relation between d and D2 of a chamber drum 20 was investigated. Results are shown in Table 3. Additionally, the other conditions are similar to those of Example 1. Moreover, Example 1 of Table 3 is the same as Example 1 of Table 1.

TABLE 3

|  | Use application | θ | d/D2 | Bend | Extrusion torque | Pressure variance | Surface state |
|---|---|---|---|---|---|---|---|
| Example 7 | Catalyst carrier | 5 | 0.05 | 0.5 mm | 2750 Nm | ±2 bar | Suitable |
| Example 1 | Catalyst carrier | 5 | 0.1 | 0.5 mm | 2180 Nm | ±3 bar | Suitable |
| Example 8 | Catalyst carrier | 5 | 0.2 | 0.5 mm | 2100 Nm | ±3 bar | Suitable |
| Example 9 | Catalyst carrier | 5 | 0.3 | 0.7 mm | 2010 Nm | ±5 bar | Suitable |
| Example 10 | Catalyst carrier | 5 | 0.4 | 1 mm | 1970 Nm | ±15 bar | Suitable |

When d/D2<0.1, the extrusion torque increased (Example 7). When d/D2>0.3, the extrusion torque became small, but the pressure variance increased (Example 10). The above cases were in an allowable range, but when 0.1≤d/D2≤0.3, the pressure variance or the extrusion torque was preferably small (Examples 1, 8 and 9).

An extruder of the present invention can be used as an extruder of ceramic formed bodies. In particular, the present invention is suitable for a large sized honeycomb formed body, and specifically for the extrusion of a honeycomb structure (formed body) for use as a DPF or a catalyst carrier to purify an exhaust gas of a gasoline car.

DESCRIPTION OF REFERENCE MARKS

1: extruder, 10: extruding section, 11: supply port (of the extruding section), 12: extrusion port (of the extruding section), 14: screw, 15: rotation blade, 16: rotary shaft, 17: drum, 20: chamber drum, 21: supply port (of the chamber drum), 22: discharge port (of the chamber drum), 23: first space portion, 23a: taper portion, 23b: cylindrical portion, 23f: upstream end of first space portion (the taper portion), 23g: downstream end of taper portion, 23h: upstream end of cylindrical portion, 23i: downstream end of first space portion (the cylindrical portion), 24: second space portion, 25: stagnation preventing die, 30: forming section, 32: first enlarging diameter portion, 33: second enlarging diameter portion, 34: screen, 36: die, 40: honeycomb formed body, 41: central axis, 50: curved drum, and 60: plunger.

What is claimed is:

1. An extruder comprising:
   an extruding section which kneads and extrudes a kneaded material including a ceramic raw material;
   a chamber drum connected to an extrusion port of the extruding section, and including a first space portion which extends from the extrusion port side of the extruding section in an extruding direction and allows the kneaded material to flow in the extruding direction, and a second space portion, which extends from a downstream side of the first space portion in a downward direction and is spaced a distance upstream from a downstream terminal end of the first space portion, and which allows the kneaded material to flow in the downward direction different from the extruding direction, and has a discharge port to discharge the kneaded material; and
   a forming section connected to the discharge port of the chamber drum, and including a die through which the kneaded material discharged through the discharge port of the chamber drum is pushed out, to extrude and form ceramic formed bodies.

2. The extruder according to claim 1, wherein the extruding direction from the extruding section is a horizontal direction, wherein the downward direction in which the chamber drum discharges the kneaded material is a gravity direction, and wherein the extruding direction from the extruding section crosses the gravity direction at right angles.

3. The extruder according to claim 1, wherein the first space portion includes a taper portion formed in such a taper shape that a sectional area decreases from the extrusion port side of the extruding section toward the downstream side of the extruding direction, and a cylindrical portion which is continuous with the taper portion.

4. The extruder according to claim 2, wherein the first space portion includes a taper portion formed in such a taper shape that a sectional area decreases from the extrusion port side of the extruding section toward the downstream side of the extruding direction, and a cylindrical portion which is continuous with the taper portion.

5. The extruder according to claim 3, wherein the taper portion has an angle θ of 5 to 30° which is represented by the following equation (1), $$\theta = \tan^{-1}(D1-D2)/2L1 \quad (1),$$

wherein D1 is a height of an inlet of the taper portion, D2 is a diameter of an outlet, and L1 is a length of the taper portion in the extruding direction.

6. The extruder according to claim 4, wherein the taper portion has an angle θ of 5 to 30° which is represented by the following equation (1), $$\theta = \tan^{-1}(D1-D2)/2L1 \quad (1),$$

wherein D1 is a height of an inlet of the taper portion, D2 is a diameter of an outlet, and L1 is a length of the taper portion in the extruding direction.

7. The extruder according to claim 1, wherein the second space portion has a cylindrical shape which extends from a lower portion of the first space portion on the downstream side thereof in the downward direction.

8. The extruder according to claim 6, wherein the second space portion has a cylindrical shape which extends from a lower portion of the first space portion on the downstream side thereof in the downward direction.

9. The extruder according to claim 7, wherein the first space portion includes a taper portion formed in such a taper shape that a sectional area decreases from the extrusion port side of the extruding section toward the downstream side of the extruding direction, and has a ratio d/D2 of 0.1 to 0.3, wherein D2 is a diameter of an outlet of the taper portion, and d is a diameter of the second space portion.

10. The extruder according to claim 8, wherein the first space portion includes a taper portion formed in such a taper shape that a sectional area decreases from the extrusion port side of the extruding section toward the downstream side of the extruding direction, and has a ratio d/D2 of 0.1 to 0.3, wherein D2 is a diameter of an outlet of the taper portion, and d is a diameter of the second space portion.

11. The extruder according to claim 1, wherein the extruding section includes:
 a drum having a supply port through which a kneaded material including a ceramic forming raw material flows into the extruding section, and an extrusion port through which the kneaded material is discharged; and
 a screw disposed in the drum, and having a rotary shaft and a rotation blade of a spiral shape along the rotary shaft, to convey the kneaded material in an extruding direction parallel to the rotary shaft while kneading the kneaded material by the rotation of the rotation blade.

12. The extruder according to claim 10, wherein the extruding section includes:
 a drum having a supply port through which a kneaded material including a ceramic forming raw material flows into the extruding section, and an extrusion port through which the kneaded material is discharged; and
 a screw disposed in the drum, and having a rotary shaft and a rotation blade of a spiral shape along the rotary shaft, to convey the kneaded material in an extruding direction parallel to the rotary shaft while kneading the kneaded material by the rotation of the rotation blade.

13. The extruder according to claim 11, wherein the extruding section is provided with the screws which are biaxially arranged in parallel in the drum.

14. The extruder according to claim 12, wherein the extruding section is provided with the screws which are biaxially arranged in parallel in the drum.

* * * * *